(12) United States Patent
Schaeuble et al.

(10) Patent No.: US 9,193,335 B2
(45) Date of Patent: Nov. 24, 2015

(54) WIPER BLADE FOR CLEANING VEHICLE WINDOWS, AND WIPER ARM

(75) Inventors: Michael Schaeuble, Vaihingen/Enz (DE); Bruno Egner-Walter, Heilbronn (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 13/432,154

(22) Filed: Mar. 28, 2012

(65) Prior Publication Data

US 2012/0246859 A1 Oct. 4, 2012

(30) Foreign Application Priority Data

Mar. 31, 2011 (DE) .......................... 10 2011 001 687

(51) Int. Cl.
*B60S 1/40* (2006.01)
*B60S 1/38* (2006.01)

(52) U.S. Cl.
CPC ............. *B60S 1/4048* (2013.01); *B60S 1/3849* (2013.01); *B60S 2001/4051* (2013.01)

(58) Field of Classification Search
CPC ................. B60S 1/3849; B60S 1/4048; B60S 2001/4051
USPC ........... 15/250.32, 250.351, 250.43, 250.361, 15/250.44, 250.201
See application file for complete search history.

(56) References Cited

U.S. PATENT DOCUMENTS

| 4,788,736 A * | 12/1988 | Arai et al. .................. 15/250.46 |
| 4,909,653 A * | 3/1990 | Biggs .............................. 403/24 |
| 6,481,044 B1 * | 11/2002 | Journee ....................... 15/250.32 |
| 7,669,276 B2 * | 3/2010 | Verelst et al. ............... 15/250.32 |
| 7,774,892 B2 * | 8/2010 | Coughlin ..................... 15/250.32 |
| 8,220,106 B2 * | 7/2012 | Fink et al. ................... 15/250.32 |
| 8,468,641 B2 * | 6/2013 | Coughlin ..................... 15/250.32 |
| 2006/0059647 A1 * | 3/2006 | Ostrowski ................... 15/250.32 |

(Continued)

FOREIGN PATENT DOCUMENTS

DE 10130903 A1 5/2002
DE 10320930 A1 11/2004

(Continued)

OTHER PUBLICATIONS

German search report Issued Mar. 27, 2012, in related German Application No. 102011001687.2 (2 pages).

(Continued)

*Primary Examiner* — Monica Carter
*Assistant Examiner* — Michael Jennings
(74) *Attorney, Agent, or Firm* — Osha Liang LLP (57) ABSTRACT

A wiper blade for cleaning vehicle windows is disclosed. The wiper blade includes a wiper blade body extending in a wiper blade longitudinal axis, with a wiper rubber and a wiper blade adapter on the wiper blade body. The wiper blade adapter forms a mechanical connection, constructed as detent connection, of the wiper blade to a wiper arm adapter arranged on a wiper arm. The wiper blade adapter and the wiper arm adapter are connected to or released from one another at least substantially in a direction which extends perpendicularly to the wiper blade longitudinal axis. Spring are provided on the wiper blade adapter and/or on the wiper arm adapter, which provide an initial spring tension when the wiper blade is mounted on the wiper arm, and bring about a releasing force between the wiper arm adapter and the wiper blade adapter when the detent connection is released.

16 Claims, 6 Drawing Sheets

(56) References Cited

U.S. PATENT DOCUMENTS

| | | |
|---|---|---|
| 2006/0218740 A1* | 10/2006 | Coughlin .................... 15/250.32 |
| 2007/0226940 A1* | 10/2007 | Thienard .................... 15/250.32 |
| 2009/0064438 A1* | 3/2009 | Boland et al. ............... 15/250.32 |
| 2009/0199357 A1* | 8/2009 | Thienard .................... 15/250.32 |
| 2010/0000041 A1* | 1/2010 | Boland ....................... 15/250.32 |
| 2010/0050361 A1* | 3/2010 | Chang et al. ............... 15/250.32 |
| 2010/0212101 A1* | 8/2010 | Thienard et al. ........... 15/250.32 |
| 2011/0056041 A1* | 3/2011 | Wu ............................ 15/250.32 |

FOREIGN PATENT DOCUMENTS

| | | | |
|---|---|---|---|
| WO | WO 2005039944 A1 * | 5/2005 | ............... B60S 1/40 |
| WO | WO 2010028866 * | 3/2010 | |
| WO | 2010/034439 A1 | 4/2010 | |

OTHER PUBLICATIONS

French search report issued Mar. 23, 2012 in related French Application No. 1252603 (3 pages).

* cited by examiner

WIPER BLADE FOR CLEANING VEHICLE WINDOWS, AND WIPER ARM

PRIOR ART

The invention relates to a wiper blade for cleaning vehicle windows as per the preamble of claim 1. Furthermore, the invention relates to a wiper arm for use with a wiper blade according to the invention.

Such a wiper blade is known from DE 103 20 930 A1. In said document, various exemplary embodiments of wiper blades are described, wherein the wiper blade illustrated in FIG. 2 of the document in question is lockable by detent engagement with a wiper arm, and wherein the wiper blade is connected to or released from the wiper arm in a direction which extends substantially perpendicularly to the wiper blade longitudinal axis. In the case of the wiper blade known from DE 103 20 930 A1, four detent tongues are provided to this end on its wiper blade adapter, in each case two detent tongues of which are arranged on opposite sides of the wiper blade adapter. Furthermore, the two detent tongues arranged on one side of the wiper blade adapter are spaced apart axially from one another. It is disadvantageous here that it is relatively complicated and time-consuming to release such a wiper blade connected to a wiper arm, since all four detent tongues have to be actuated simultaneously in order to release the detent tongues from corresponding recesses or receptacles in the wiper arm.

SUMMARY OF THE INVENTION

On the basis of the prior art illustrated, the object of the invention is to develop a wiper blade for cleaning vehicle windows as per the preamble of claim 1 such that it is easier for a user to release the detent connection between the wiper blade and a wiper arm. In the case of a wiper blade for cleaning vehicle windows having the features of claim 1, this object is achieved according to the invention in that spring means are provided on the wiper blade adapter and/or on the wiper arm adapter, said spring means providing a spring tension when the wiper blade is mounted on the wiper arm, and bringing about a releasing force between the wiper arm adapter and the wiper blade adapter when the detent connection is released. In other words, this means that the releasing of the wiper blade from the wiper arm is actively supported by the spring means according to the invention, and so the required releasing or operating forces are reduced. In particular, on account of the active releasing movement of the wiper blade from the wiper arm, a user can see straight away that the detent connection between the wiper blade and the wiper arm has been released.

Advantageous developments of the wiper blade according to the invention for cleaning vehicle windows are given in the dependent claims. The scope of the invention includes all combinations of at least two features disclosed in the claims, the description and/or the figures.

In a structural development of the invention, which makes it easier for a user to connect the wiper blade to the wiper arm, it is proposed that centering means are provided on the wiper blade adapter and on the wiper arm adapter, said centering means, when the wiper blade is connected to the wiper arm, guiding the latter toward one another in the joining direction and centering them.

It is further particularly preferred for the detent connection to comprise two detent tongues which are arranged on opposite sides of the wiper blade adapter, are elastically deformable transversely to the wiper blade longitudinal axis and interact with in each case one detent region on the wiper arm adapter in order to fasten the wiper blade on the wiper arm.

In a first structural configuration of the spring means, it is proposed that the spring means are arranged on the wiper blade adapter, and that the spring means comprise at least one spring tongue, which is integrally formed on the wiper blade adapter and projects in the direction of the wiper blade adapter and is elastically bendable. Such an embodiment has the advantage that the spring means can be formed independently for example from the detent connection or the detent tongues, as a result of which, for example, particularly high prestressing forces can be generated.

In a structural alternative thereto, it is proposed that the spring means are arranged on the wiper blade adapter, that the detent tongues are integrally formed on the wiper blade adapter, and that the detent tongues have a spring edge on the side facing the wiper arm adapter, said spring edge being elastically prestressed by the wiper arm adapter when the detent tongues are engaged.

In the alternatives discussed above, it is in particular provided that the spring means are arranged on the wiper blade adapter. Since the wiper blade adapter is a constituent part of the wiper blade, which is exchanged or replaced for example at regular intervals, in these solutions, despite an intact spring means, the wiper blade adapter is replaced together with the spring means. In order if appropriate to produce the wiper blade in a particularly cost-effective manner, it is therefore provided in a further embodiment of the invention that the spring means are arranged on the wiper arm adapter and comprise at least one elastically deformable spring tongue projecting in the direction of the wiper blade adapter. The spring means are thus a constituent part of the wiper arm adapter and remain arranged thereon as a rule for the entire lifetime or service life of the vehicle.

In order to ensure the function of the spring means over the entire lifetime of the vehicle in the case of such spring means arranged on the wiper arm adapter, i.e. in particular to construct particularly robust spring means, it is therefore proposed that the spring tongue preferably consists of metal and is constructed as a separate component from the wiper arm adapter. The construction as a separate component results additionally in the possibility of exchanging said component in the event of damage, without the entire wiper arm adapter having to be replaced to this end.

In order to make it easier to remove or mount such a spring tongue, it is preferably provided that the spring tongue is detachably connected to the wiper arm adapter by means of a holding element.

It is also important that the wiper blade does not unintentionally become detached from the wiper arm, or that the detent connection between the wiper blade and the wiper arm is accidentally released. To this end, in a further structural embodiment of the invention, it is provided that the detent tongues have pressure regions which are each arranged in a recess in the wiper blade adapter, wherein the detent tongues terminate transversely to the wiper blade adapter and flush with the side faces, delimiting the recesses, of the wiper blade adapter. As a result, the detent tongues are arranged in the wiper blade adapter in a protected manner in their engaged position, and so the probability of the detent connection between the wiper blade and the wiper arm releasing in an undesired or unintentional manner is reduced.

In a further embodiment of the invention, which makes it unlikely for the user to unintentionally release the detent connection, it is proposed that the two detent tongues are arranged in a staggered manner with respect to one another in the wiper blade longitudinal direction. On account of the staggered arrangement of the detent tongues, the latter can be released with the fingers of one hand in particular only with the fingers in a relatively unnatural position, or the fingers of both hands have to operate the corresponding detent tongues in order, to release them.

A further embodiment of the invention relates to the avoidance of, for example, noise-inducing play between the wiper blade adapter and the wiper arm adapter transversely to the wiper blade longitudinal axis. To this end, it is provided according to the invention that, in the unloaded state, the detent tongue projects laterally beyond the joint contour of the wiper blade adapter and applies force to the wiper blade adapter in a transverse direction. On account of this prestressing of the detent tongue, any bearing play that occurs over the service life of the wiper blade is thus eliminated or compensated.

In order to increase the centering force generated by the detent tongue, it is proposed in this case that force is applied to the detent tongue in the direction of the joint contour of the wiper blade adapter by means of a tongue-like tension spring element which is preferably constructed as a metal part.

Further advantages, features and details of the invention will become apparent from the following description of preferred exemplary embodiments and by way of the drawing, in which.

Identical components or components having the same function are provided with the same reference signs in the figures.

Figures 1, 2:
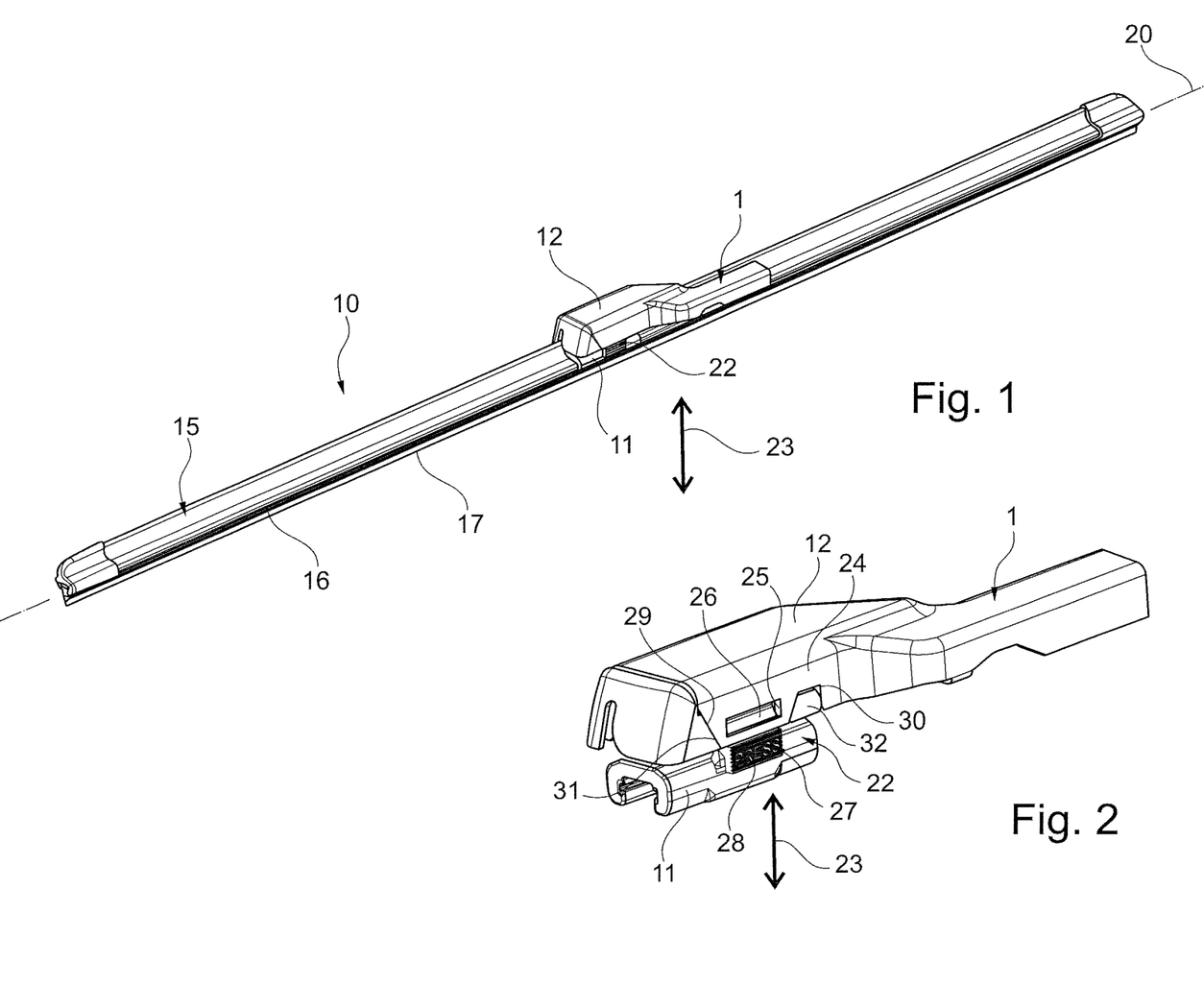
FIG. 1 shows a perspective view of a wiper blade according to the invention fastened to a wiper arm.
FIG. 2 shows an enlarged detail illustration, likewise in a perspective view, of parts of the wiper arm and of the wiper blade from FIG. 1.

FIG. 1 illustrates a wiper blade 10 according to the invention for cleaning windows of motor vehicles. The wiper blade 10 is fastened to a wiper arm adapter 12 in an exchangeable manner by means of a wiper blade adapter 11, said wiper arm adapter 12 in turn being a constituent part of a wiper arm 1 which is not specifically illustrated in more detail, or being connected to the wiper arm 1. The wiper arm 1 is moved back and forth in a known manner by means of a windshield wiper drive (not illustrated).

The wiper blade 10 has an elongate wiper blade body 15, which has a wiper rubber 16 on the side facing the vehicle window, said wiper rubber 16 having a wiper lip 17 which is arranged so as to be operatively connected to the vehicle window. The wiper blade body 15 extends at least substantially in a straight line along a wiper blade longitudinal axis 20.

The precise structural configuration of the wiper blade body 15 is not of substantial importance within the scope of this invention. In particular, the wiper blade body 15 can be configured as what is known as an "aqua blade", that is to say as a wiper blade 10 having integrated nozzle openings for applying washing fluid to the vehicle window, if appropriate optionally with an additional heating device.

All that is important is that the wiper blade body 15 firmly connected to the wiper blade adapter 11 is connected in a detachable manner to the wiper arm adapter 12 by means of a detent connection 22 that will be explained in more detail below, and that the mounting or removal direction of the wiper blade 10 on the wiper arm 1 is in the direction of the double arrow 23, with the direction of the double arrow 23 extending at least substantially perpendicularly to the wiper blade longitudinal axis 20.

FIG. 2 illustrates the detent connection 22 between the wiper blade adapter 11 and the wiper arm adapter 12 in an enlarged manner. In particular, it can be seen that a recess in the form of a through-passage 25, said recess being in each case rectangular in the exemplary embodiment, is formed as a detent region on opposite side walls 24 of the wiper arm adapter 12, a detent nose 26 of a detent tongue 27 arranged on the wiper blade adapter 11 engaging in a form-fitting manner in said recess in order to fix the wiper blade adapter 11 on the wiper arm adapter 12. In order to release the detent connection 22 between the wiper blade adapter 11 and the wiper arm adapter 12, the detent tongue 27 additionally has a pressure region 28, which can be pushed in manually by a user in the direction of the wiper blade adapter 11, so that the detent noses 26 disengage from the through-passages 25 when the pressure regions 28 of the two opposite detent tongues 27 are simultaneously pushed toward one another, in order in this way to enable the wiper blade adapter 11 or the wiper blade 10 to be able to be detached from the wiper arm adapter 12 and thus from the wiper arm 1.

In order to make it easier for the user to join the two parts together when the wiper blade 10 is mounted on the wiper arm 1, the wiper arm adapter 12 additionally has in each case an insertion slope 29 and a recess 30 on the opposing side walls 24. The insertion slope 29 and the recess 30 interact with a corresponding edge 31 and protrusion 32, respectively, which are arranged or formed, respectively, on the wiper blade adapter 11. On account of the geometric configuration, when the wiper blade 10 and the wiper arm 1 are joined together, the wiper blade adapter 11 is guided and centered on the wiper arm adapter 12 in one direction of the double arrow 23.

Figure 3:
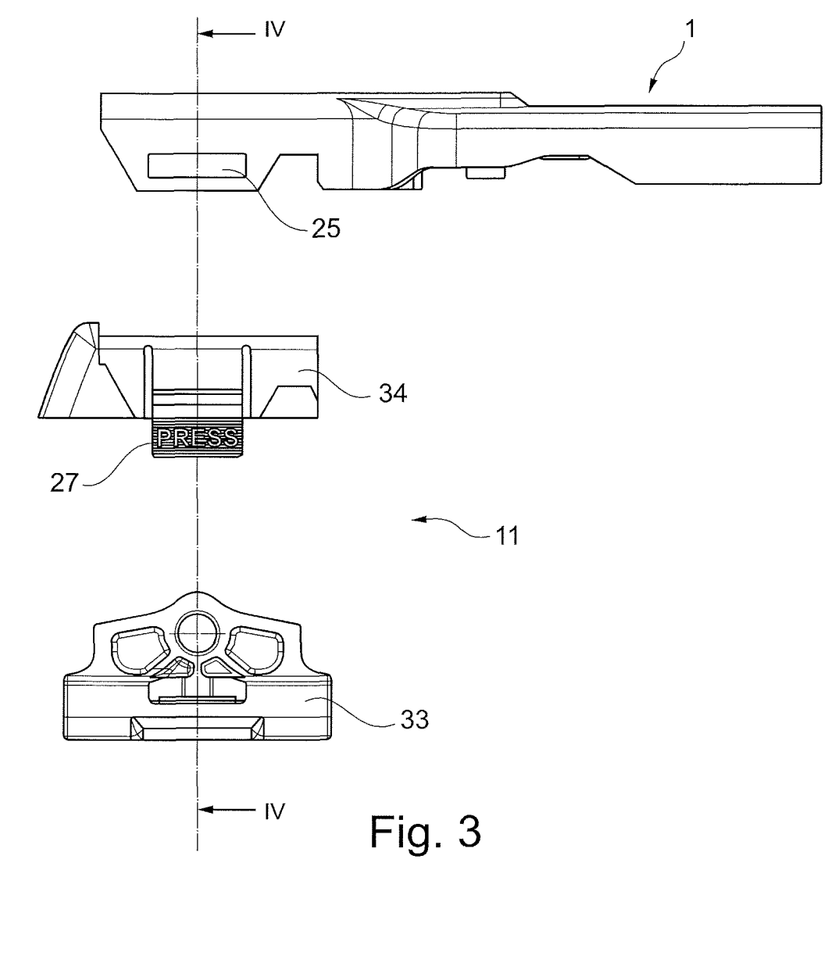
FIG. 3 shows a side view of parts of the wiper blade according to the invention and of the wiper arm in a first embodiment of the invention.
Figure 4:
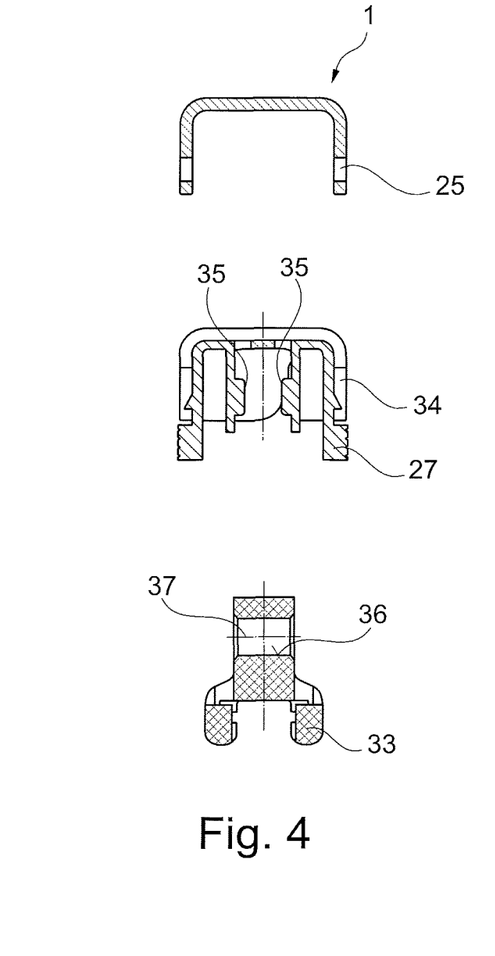
FIG. 4 shows a section in the plane IV-IV in FIG. 3.

As can be seen in particular from viewing FIGS. 3 and 4 together, the wiper blade adapter 11 consists of an adapter element 33 on the wiper-blade side and an adapter element 34 on the wiper-arm side, said adapter elements being arranged in a pivotable manner with respect to one another. To this end, the adapter element 34 on the wiper-arm side has guide pins 35 on opposite sides, said guide pins 35 engaging in a through-hole 36 in the adapter element 33 on the wiper-blade side. The axis of the through-hole 36 also defines the pivot axis 37 between the adapter element 33 on the wiper-blade side and the adapter element 34 on the wiper-arm side.

Figures 5, 9, 15:
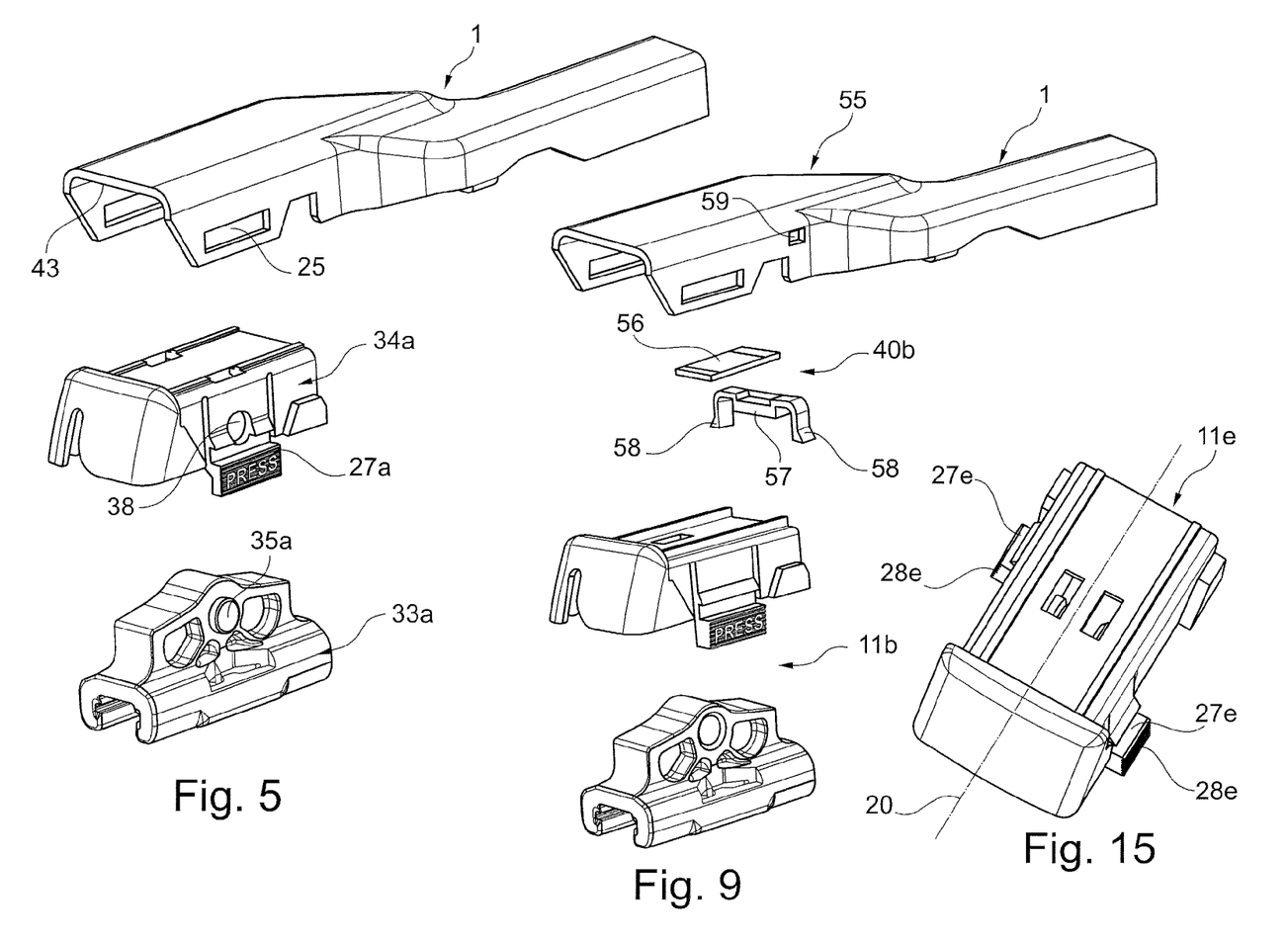
FIG. 5 shows a perspective view of constituent parts of a wiper blade which is modified compared with FIG. 3.
FIG. 9 shows a perspective view of a further modification of a wiper blade according to the invention with parts of the wiper arm.
FIG. 15 shows a perspective top view of a wiper blade adapter having axially spaced-apart detent tongues.

In a modification of FIGS. 3 and 4, FIG. 5 illustrates an exemplary embodiment in which the adapter element 34a on the wiper-arm side has in each case a hole 38 in the region of the spring tongues 27a, a guide pin 35a formed on the adapter element 33a on the wiper-blade side engaging in said hole 38.

In order to make it easier for a user to remove the wiper blade 10 from the wiper arm 1, it is provided according to the invention that the releasing movement of the wiper blade adapter 11 from the wiper arm adapter 12 is actively supported. To this end, reference is first of all made to FIG. 6: for this purpose, the wiper blade adapter 11 illustrated there or the adapter element 34 on the wiper-arm side has in the exemplary embodiment, on the top side facing the wiper arm adapter 12, two spring means 40 in the form of spring tongues 41, which are arranged in a manner oriented along the wiper blade longitudinal axis 20. On one side, the spring tongues 41 are integrally formed on the adapter element 34 on the wiper-arm side, and, on the side not connected to the adapter element 34, project on opposite sides from the top side of the adapter element 34 on the wiper-arm side in the direction of the wiper arm adapter 12 (not illustrated).

Figure 6:
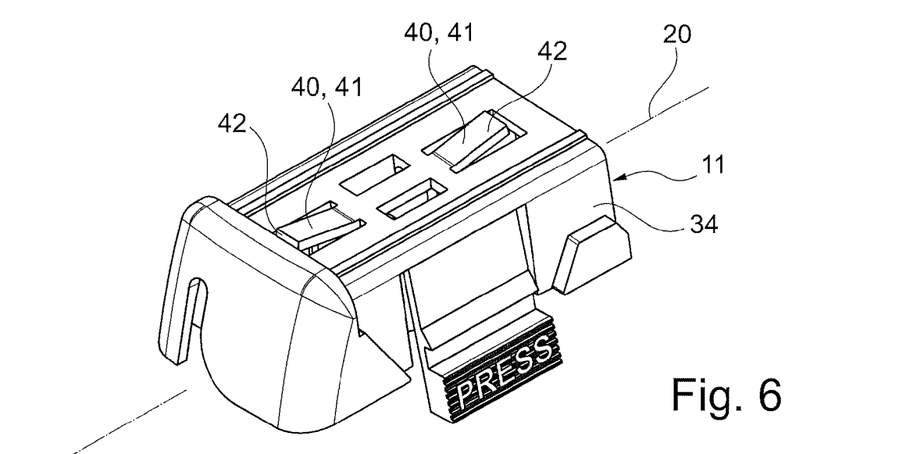
FIG. 6 shows a perspective view of a part of a wiper blade adapter having spring tongues arranged on the top side of the wiper blade adapter in order to generate releasing forces in the axial direction.

When the wiper blade adapter 11 is connected to the wiper arm adapter 12, those projecting spring sections 42 of the spring tongues 41 which are furthest from the top side of the adapter element 34 on the wiper-arm side become operatively connected to the inner side 43 (see FIG. 5) of the wiper arm adapter 12, which has a U-shaped cross section. In this case, the spring tongues 41 are pushed in in the direction of the adapter element 34 on the wiper-arm side and produce a prestress. This prestress remains during the formation of the detent connection 22 between the wiper blade adapter 11 and the wiper arm adapter 12. When the detent connection 22 between the wiper blade 10 and the wiper arm 1 is released, in particular as soon as the detent noses 26 are no longer operatively connected to the through-passages 25 in the wiper arm adapter 12, the wiper blade adapter 11 is moved away from the wiper arm adapter 12 as a result of the prestress produced by the spring means 40, and this can be detected easily by a user and signals to him that the detent connection 22 has been released.

Figure 7:
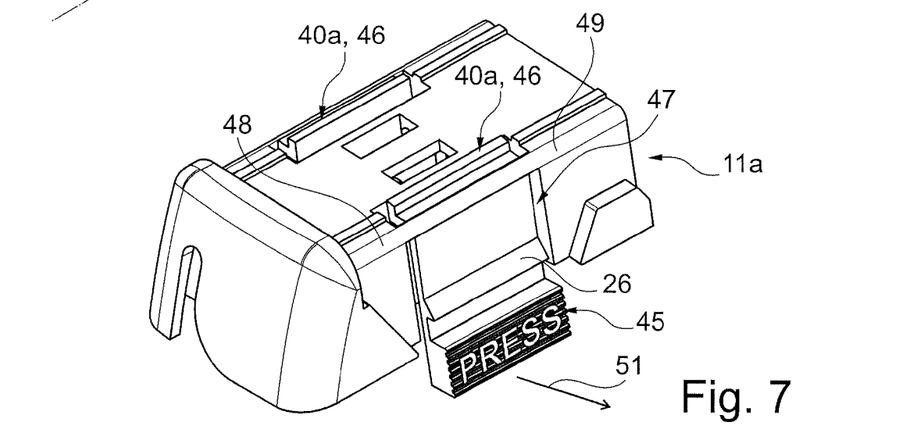
FIG. 7 shows a perspective view of a wiper blade adapter which is modified compared with FIG. 6.

FIG. 7 illustrates a modified wiper blade adapter 11a. In the modified wiper blade adapter 11a the spring means 40a are formed integrally on the detent tongues 45 in the form of strip-like spring edges 46 projecting from the top side of the wiper blade adapter 11a. The detent tongue 45 for its part is arranged pivotably in a recess 47 in the wiper blade adapter 11a and is connected thereto via two connecting webs 48, 49 formed between the wiper blade adapter 11a and the detent tongue 45 on the top side edge. When the wiper blade adapter 11a is connected to the wiper arm adapter 12 (not shown), the spring edges 46 become operatively connected to the inner side 43 of the wiper arm adapter 12, with the spring edges 46 being pushed in elastically in the direction of the wiper blade adapter 11a, and in the process producing a pivoting movement of the detent tongues 45 in the direction of the arrow 51 via the connection to the detent tongues 45. The pivoting movement in the direction of the arrow 51 brings about at the same time a particularly secure detent connection 22, since the detent noses 26 are forced by the prestressed spring means 40a into the corresponding through-passages 25 in the wiper arm adapter 12. Furthermore, as a result, compensation for play between the wiper blade adapter 11a and the wiper arm adapter 12 in the transverse direction to the wiper blade longitudinal axis 20 is simultaneously brought about between the wiper blade adapter 11a and the wiper arm adapter 12.

Figure 8:
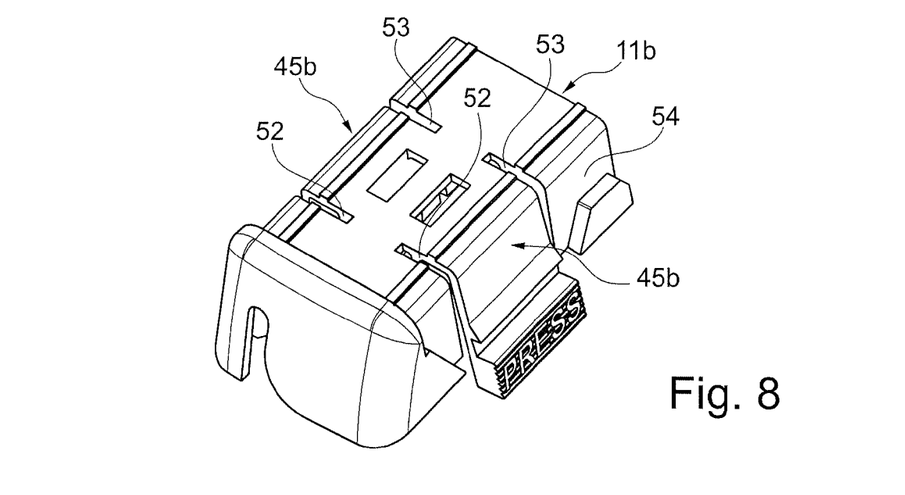
FIG. 8 shows a perspective view of a modification of the wiper blade adapter according to FIG. 7.

FIG. 8 illustrates a wiper blade adapter 11b which has no spring means 40, 40a. The detent tongues 45b project, in a manner separated from the wiper blade adapter 11b by two transverse slots 52, 53, laterally beyond the contour of the side walls 54 of the wiper blade adapter 11b and thus beyond the joint contour to the wiper arm adapter 12 and as a result likewise produce a prestress in the spring tongues 45b when engaging with the wiper arm adapter 12. This prestress brings about compensation for play in a direction transverse to the wiper blade longitudinal axis 20.

In FIG. 9, the spring means 40b are arranged, in contrast to the abovementioned exemplary embodiments, on or in the wiper arm adapter 55. Such a wiper arm adapter can be combined for example with the wiper blade adapter 11b illustrated in FIG. 8, which for its part has no spring means 40, 40a, but is designed merely to compensate play in the transverse direction to the wiper blade longitudinal axis 20. To this end, the wiper arm adapter 55 has a spring tongue 56, which consists of metal, is configured in the form of a strip and is fastened in an exchangeable manner in the wiper arm adapter 55 by means of a holding element 57. To this end, the holding element 57 has detent projections 58 on opposite sides, said detent projections engaging in a form-fitting manner in corresponding recesses 59 in the wiper arm adapter 55 when the holding element 57 is mounted and in the process fixing the spring tongue 56 in the wiper arm adapter 55.

Figure 10:
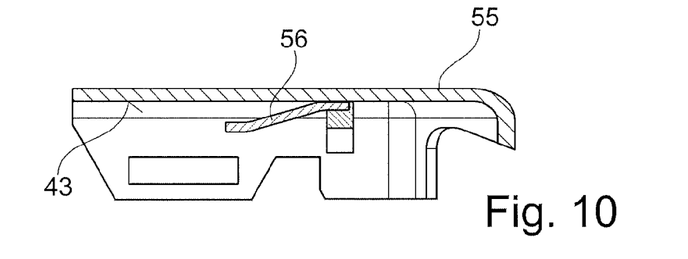
FIGS. 10 and 11 show longitudinal sections through the parts of the wiper blade and of the wiper arm according to FIG. 9 in the detached and joined-together state, respectively.
Figures 11, 12, 13:
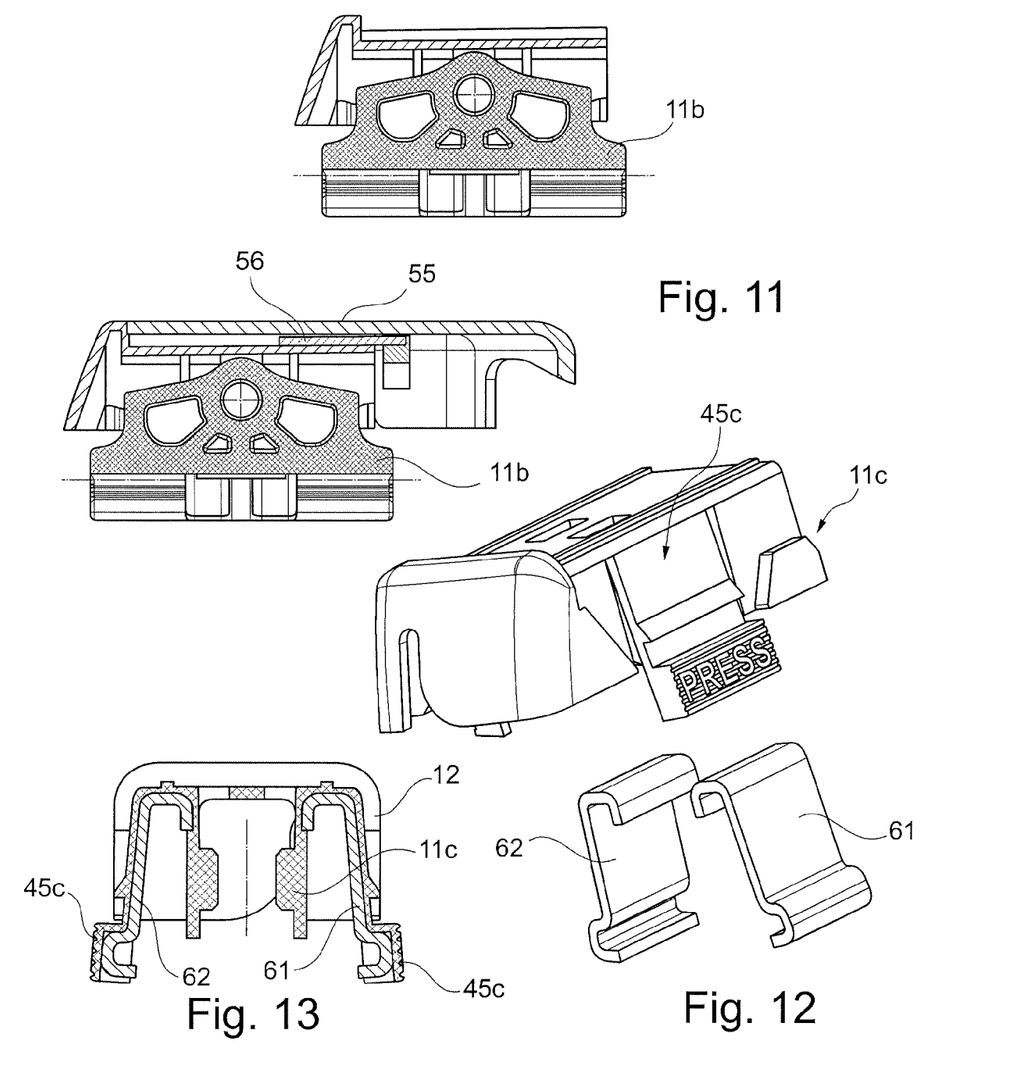
FIG. 12 shows a perspective view of parts of a further exemplary embodiment of a wiper blade adapter.
FIG. 13 shows a cross section through the wiper blade adapter according to FIG. 12 in the mounted state.

As can be seen in particular from viewing FIGS. 10 and 11 together, when the wiper blade 10 has not yet been mounted, the spring tongue 56 projects from the inner side 43 of the wiper arm adapter 55 in the direction of the wiper blade adapter 11b. As can also be seen from FIG. 11, when the wiper blade adapter 11b is mounted, the spring tongue 56 is pushed by the latter in the direction of the inner side 43 of the wiper arm adapter 55 and in the process is elastically prestressed.

In FIG. 8, in order to prestress the spring tongues 45b in a direction transversely to the wiper blade longitudinal axis 20, it was proposed to allow the detent tongues 45b to project beyond the side wall 54 of the wiper blade adapter 11b. In order to support or to produce such transverse forces, it can also be provided, in accordance with FIGS. 12 and 13, for the detent tongues 45c in the case of the wiper blade adapter 11c to be pushed by means of separate, strip-like and curved tension spring elements 61, 62, which consist in particular of metal, in the direction of the wiper arm adapter 12 engaging around the wiper blade adapter 11c, as can be seen in particular from FIG. 13. To this end, the tension spring elements 61, 62 are connected to the wiper blade adapter 11c in a form-fitting or force-fitting manner.

Figure 14A:
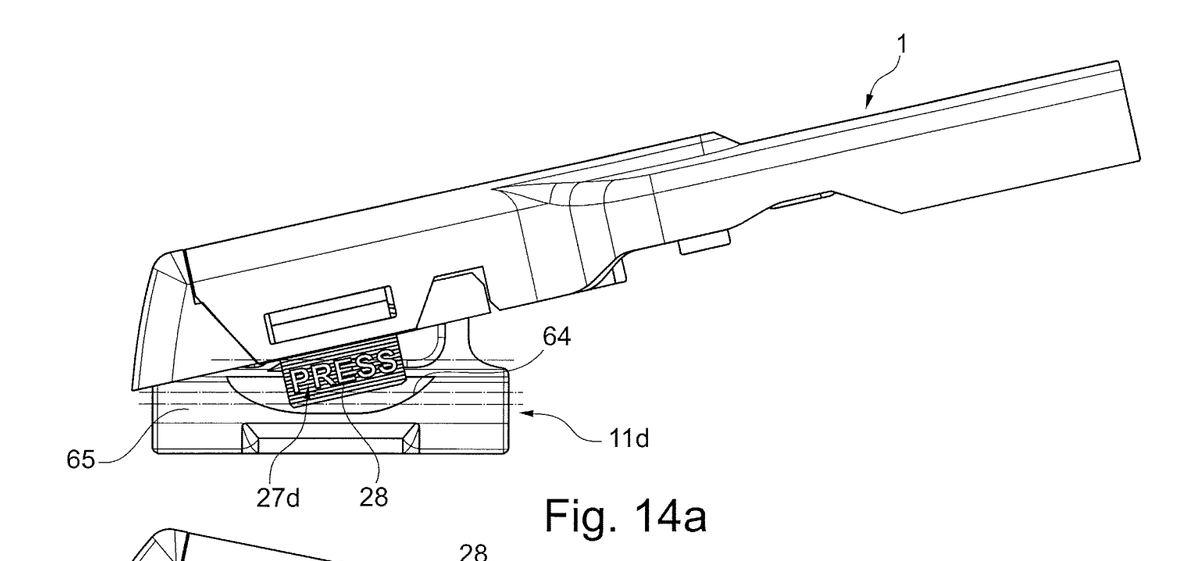
FIGS. 14a and 14b show a side view of a further modified wiper blade adapter having a wiper arm fastened thereto in various operating positions.
Figure 14B:
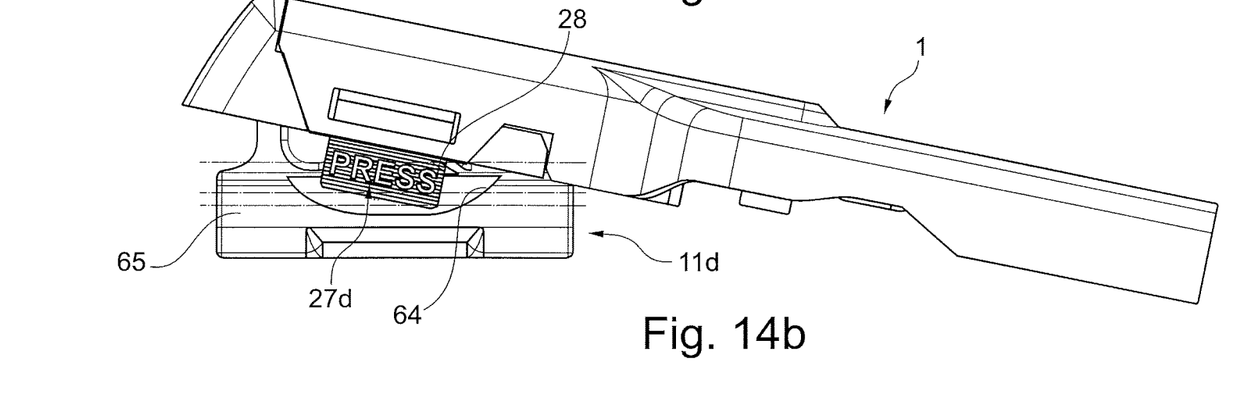

In order to avoid unintentional releasing of the wiper blade 10 from the wiper arm 1, it is proposed, in the case of the wiper blade adapter 11d illustrated in FIGS. 14a and 14b, that said wiper blade adapter 11d has recesses 64 in the region of the pressure regions 28, said recesses 64 being formed such that the pressure regions 28, when the wiper blade 10 is mounted, are arranged approximately flush with the side faces 65 of the wiper blade adapter 11d. A corresponding configuration of the recesses 64 ensures in particular that a pivoting movement between the wiper arm 1 and the wiper blade 10 or the wiper blade adapter 11d is enabled.

Finally, a further modified wiper blade adapter 11e is illustrated in FIG. 15. In the case of the wiper blade adapter 11e, the two detent tongues 27e and the pressure regions 28e are arranged in an axially staggered manner behind one another in relation to the wiper blade longitudinal axis 20.

The wiper blade 10 described to this extent can be modified in a variety of ways without departing from the concept of the invention. In particular, it is also conceivable for not only the wiper blade adapter 11, 11a to 11e, but in addition also the wiper arm adapter 12 to have spring means.

The invention claimed is:

1. A wiper blade for cleaning vehicle windows, comprising:
   a wiper blade body extending in a wiper blade longitudinal axis, the wiper blade body comprising a wiper rubber and a wiper blade adapter,
     wherein the wiper blade adapter forms a mechanical connection, constructed as detent connection, of the wiper blade with a wiper arm adapter arranged on a wiper arm,
     wherein the wiper arm adapter has a U-shaped cross-section and defines a closed housing delimited by a bottom and two legs, and
     wherein connecting or releasing between the wiper blade adapter and the wiper arm adapter takes place at least substantially in a direction which runs perpendicularly to the wiper blade longitudinal axis; and
   spring means provided on the wiper blade adapter which, with the wiper blade mounted on the wiper arm, provide an initial spring tension, and which, on releasing of the detent connection bring about a releasing force between the wiper arm adapter and the wiper blade adapter,
     wherein the spring means are positioned between the wiper blade adapter and the wiper arm adapter and are received within the closed housing defined by the wiper arm adapter, wherein when the spring means provide an initial spring tension, the spring means are prestressed against the bottom of the wiper arm adapter.

2. The wiper blade according to claim 1, further comprising centering means provided on the wiper blade adapter and on the wiper arm adapter, which on connecting of the wiper blade with the wiper arm guide and center the wiper blade adapter and the wiper arm adapter to each other in a joining direction.

3. The wiper blade according to claim 1, wherein the spring means are arranged on the wiper blade adapter, and the spring means comprise at least one spring tongue, which is formed in one piece on the wiper blade adapter and projects in the direction of the wiper arm and is bendable elastically.

4. The wiper blade according to claim 1, wherein the wiper blade is operatively connected to a wiper arm.

5. The wiper blade according to claim 1, wherein the detent connection comprises two detent tongues, arranged on opposite sides of the wiper blade adapter and elastically deform transversely to the wiper blade longitudinal axis.

6. The wiper blade according to claim 5, wherein the spring means are arranged on the wiper blade adapter, the detent tongues are formed in one piece on the wiper blade adapter, and the detent tongues have on a side facing the wiper arm adapter, spring edges, which are elastically prestressed on engaging of the detent tongues by the wiper arm adapter.

7. The wiper blade according to claim 6, wherein the detent tongue is arranged in a recess of the wiper blade adapter and is connected therewith via two webs running in the longitudinal direction of the wiper blade.

8. The wiper blade according to claim 5, wherein the detent tongue is separated from the wiper blade adapter by two transverse slits arranged spaced apart from each other, running perpendicularly with respect to the wiper blade longitudinal axis.

9. The wiper blade according to claim 8, wherein the spring means are arranged on the wiper arm adapter and comprise at least one elastically deformable spring tongue projecting in the direction of the wiper blade adapter.

10. The wiper blade according to claim 9, wherein the spring tongue preferably consists of metal and is constructed as a separate component from the wiper arm adapter.

11. The wiper blade according to claim 10, wherein the spring tongue is detachably connected with the wiper arm adapter by a holding element.

12. The wiper blade according to claim 5,
    wherein the pressure regions of the detent tongues are arranged respectively in a recess of the wiper blade adapter, and
    wherein the detent tongues terminate transversely to the wiper blade adapter flush with the side faces of the wiper blade adapter delimiting the recesses.

13. The wiper blade according to claim 5, wherein the two detent tongues are arranged staggered axially with respect to each other in the wiper blade longitudinal axis.

14. The wiper blade according to claim 5, wherein each detent tongue comprises:
    a detent nose, which cooperates with a detent region on the wiper arm adapter, wherein the detent region on the wiper arm adapter is a through passage; and
    a pressure region that is configured to be pushed in manually by a user in a direction of the wiper blade adapter.

15. The wiper blade according to claim 14, wherein the detent tongue in an unstressed state projects laterally over the joint contour of the wiper blade adapter and acts upon the wiper arm adapter by force in a transverse direction.

16. The wiper blade according to claim 15, wherein the detent tongue is acted upon by force in a direction of the joint contour of the wiper blade adapter by a tongue-like tension spring element constructed as a metal part.

* * * * *